United States Patent
Rossi et al.

(10) Patent No.: US 11,821,476 B2
(45) Date of Patent: Nov. 21, 2023

(54) DISC BRAKE CALIPER BODY

(71) Applicant: FRENI BREMBO S.P.A., Curno (IT)

(72) Inventors: Hydra Rossi, Curno (IT); Andrea Matti, Curno (IT)

(73) Assignee: Brembo S.p.A., Bergamo (IT)

(*) Notice: Subject to any disclaimer, the term of this patent is extended or adjusted under 35 U.S.C. 154(b) by 305 days.

(21) Appl. No.: 17/253,317

(22) PCT Filed: Jun. 17, 2019

(86) PCT No.: PCT/IB2019/055050
§ 371 (c)(1),
(2) Date: Dec. 17, 2020

(87) PCT Pub. No.: WO2019/244004
PCT Pub. Date: Dec. 26, 2019

(65) Prior Publication Data
US 2021/0277969 A1 Sep. 9, 2021

(30) Foreign Application Priority Data
Jun. 21, 2018 (IT) .......................... 102018000006547

(51) Int. Cl.
*F16D 65/00* (2006.01)
*F16D 55/22* (2006.01)
*F16D 55/00* (2006.01)

(52) U.S. Cl.
CPC ......... *F16D 65/0075* (2013.01); *F16D 55/22* (2013.01); *F16D 2055/0016* (2013.01)

(58) Field of Classification Search
CPC ............. F16D 55/22; F16D 2055/0016; F16D 65/0068; F16D 65/0075
(Continued)

(56) References Cited

U.S. PATENT DOCUMENTS

| 3,183,999 A | 5/1965 | Buyze et al. |
| 6,910,555 B2 | 6/2005 | Ciotti et al. |

(Continued)

FOREIGN PATENT DOCUMENTS

| DE | 102008029582 A1 | 4/2009 |
| EP | 1534974 B1 | 3/2007 |

(Continued)

OTHER PUBLICATIONS

European Patent Office, International Search Report with Written Opinion, issued in PCT/IB2019/055050, dated Sep. 10, 2019, 14 pages, European Patent Office, Rijswijk, Netherlands.

*Primary Examiner* — Christopher P Schwartz
(74) *Attorney, Agent, or Firm* — Marshall & Melhorn, LLC

(57) ABSTRACT

A caliper body has a first elongated element facing a first braking surface. The first elongated element has first and second ends. The caliper body has a second elongated element facing a second braking surface. The first elongated element has first and second ends of second elongated element. The first ends of first and second elongated elements face each other. The second ends of first and second elongated elements face each other. The first ends of first and second elongated elements are connected by a first end bridge. The second ends of first and second elongated elements are connected by a second end bridge. The first and second elongated elements are connected by a central bridge. The first or second elongated element has two connecting housings for connection to a support for the caliper body in a vehicle.

15 Claims, 8 Drawing Sheets

(58) Field of Classification Search
USPC ......... 188/73.31, 73.39, 73.43, 73.46, 73.47, 188/369, 370
See application file for complete search history.

(56) References Cited

U.S. PATENT DOCUMENTS

| | | | |
|---|---|---|---|
| 7,234,568 B2 | 6/2007 | Schorn et al. | |
| 7,766,132 B2 | 8/2010 | Veneziano et al. | |
| 8,701,841 B2 | 4/2014 | Crippa et al. | |
| 9,046,141 B2 | 6/2015 | Bass et al. | |
| 9,291,224 B2 | 3/2016 | Crippa et al. | |
| 9,371,874 B2 | 6/2016 | Previtali et al. | |
| 9,746,042 B2 | 8/2017 | Morio et al. | |
| 10,619,686 B2 | 4/2020 | Blackwell et al. | |
| 2003/0178261 A1 | 9/2003 | Ciotti et al. | |
| 2004/0216967 A1 | 11/2004 | Veneziano et al. | |
| 2013/0092481 A1* | 4/2013 | Crippa ............... | F16D 65/0068 188/73.31 |
| 2013/0199879 A1 | 8/2013 | Thompson et al. | |
| 2013/0277158 A1* | 10/2013 | Previtali ............. | F16D 65/0075 188/73.47 |
| 2014/0158488 A1* | 6/2014 | Valle .................. | F16D 65/0068 188/370 |
| 2016/0208872 A1 | 7/2016 | Morio et al. | |

FOREIGN PATENT DOCUMENTS

| | | |
|---|---|---|
| EP | 1911989 B1 | 7/2009 |
| EP | 2516879 B1 | 1/2014 |
| EP | 2553289 B1 | 1/2015 |
| EP | 2022999 B2 | 8/2016 |
| EP | 2553289 B9 | 4/2017 |
| WO | WO2015/097678 A1 | 7/2015 |
| WO | WO2015/097678 A9 | 10/2015 |
| WO | WO2017/081488 A1 | 5/2017 |
| WO | WO2017/212668 A1 | 12/2017 |

* cited by examiner

DISC BRAKE CALIPER BODY

CROSS-REFERENCE TO RELATED APPLICATIONS

This application is a National Phase Application of PCT International Application No. PCT/IB2019/055050, having an International Filing Date of Jun. 17, 2019 which claims priority to Italian Application No. 102018000006547 filed Jun. 21, 2018, each of which is hereby incorporated by reference in its entirety.

FIELD OF THE INVENTION

In its most general aspect, the present invention relates to a caliper body for a disc brake, e.g. for a motor vehicle, and to a disc brake caliper which comprises such a body.

In particular, in a disc brake, the brake caliper is arranged straddling the outer peripheral margin of a brake disc. The brake caliper usually comprises a body having two elongated elements which are arranged so as to face opposite braking surfaces of a disc. Clutch pads are provided arranged between each elongated element of the caliper and the braking surfaces of the brake disc. At least one of the elongated elements of the caliper body has cylinders adapted to accommodate pistons, in some cases hydraulic, but also electrically actuated, capable of applying a thrust action on the pads, abutting them against the braking surfaces of the disc to apply the braking action on the vehicle.

Background Art

Brake calipers are usually constrained to a supporting structure which remains stationary to the vehicle, such as, for example, a spindle of a vehicle suspension.

In a typical arrangement, one of the two elongated elements has two or more attachment portions of the body of the caliper to the supporting structure, e.g. providing slots or eyelets, e.g. arranged axially, or holes, e.g. arranged radially, adapted to receive screws for fixing the caliper which, with their ends are received in threaded holes provided on the caliper support.

In a typical caliper body construction, the elongated elements facing the braking surfaces of the disc are connected to each other by bridge-like elements arranged straddling the disc.

A caliper body of this type is described in EP-A-2022999 by AP RACING LTD. FIG. 1 of EP-A-2022999 shows a caliper body of the fixed caliper type. This caliper body is of the monobloc type comprising two elongated elements, the ends of which are mutually connected by bridges. Stiffening rods extend between the elongated elements and between the two bridges whereby forming a cross-shaped structure.

The caliper consists of several different components mounted on the body, such as pistons, seals, bleed devices and brake fluid feeding pipes.

Typically, the caliper body is made of metal, such as aluminum or aluminum alloy or cast iron. The body of the caliper can be obtained by casting, but also by mechanical stock removal machining, as well as forging.

The caliper body can be made either in one single piece or monobloc, but also in form of two semi-calipers, or semicalipers, typically connected to each other along a plane which usually coincides with the median plane of the disc on which the caliper is arranged straddling.

Desiring to stop or decelerate the vehicle, the driver applies a force on the brake pedal, in the case of a motor vehicle. Such a force on the brake pedal applies, through a brake master cylinder, a brake fluid pressure which through a pipe is applied to the brake fluid present in the hydraulic circuit placed inside the caliper body to reach the cylinders where the pressure is applied onto the bottom surface of the pistons, whereby forcing them to be close against the pads, which in turn abut against the braking surfaces of the disc.

The pressure action of the brake fluid is also applied on the bottom wall of the cylinder, whereby causing a reaction in the caliper body which deforms it away of the disc surfaces. This deformation of the caliper body leads to an increase of piston stroke, and thus to an increase of brake pedal stroke.

The caliper body also deforms as a function of the torque applied by the action of the pistons which, by abutting the pads against the braking surfaces of the disc, apply a deformation moment in directions which form torque arms with respect to the fixing points of the caliper body to its support. These torques also deform the caliper body in a tangential and radial direction with respect to the disc, as well as an axial direction.

The caliper body must therefore have sufficient structural rigidity to ensure that this deformation of the caliper body caused by the braking action is maintained within acceptable values, which in addition to avoiding damage to the brake system does not create the feeling of a yielding braking system to the driver, whereby causing an extra travel of the lever or the pedal of the brake system and creating a spongy feeling. This necessity urges having extremely rigid structures for the bodies of the caliper and thus to increase the dimensions and weight thereof.

On the other hand, the caliper body being constrained to the vehicle suspension and arranged straddling the disc, is one of the unsprung weights that it is desirable to reduce as much as possible to increase vehicle performance.

Obviously, these considerations are taken to the extremes when the vehicle is of the racing type and the user desires a braking system which is extremely responsive to commands and at the same time is extremely light so as not to penalize racing vehicle performance.

The need is therefore felt for a disc brake caliper body which has improved structural characteristics, the weight of the caliper body being the same, or has equal structural features, the weight being lower than the solutions of the prior art.

Solutions of caliper bodies designed to increase structural rigidity are known. For example, aforementioned patent application EP-A-2022999 by AP RACING LTD, patent application EP-A-1534974 by FRENI BREMBO SPA, United States patent U.S. Pat. No. 6,708,802 by LUCAS AUTOMOTIVE GMBH, European patent application EP-A-1911989 by FRENI BREMBO SPA and United States patent U.S. Pat. No. 3,183,999 by BUDD CO all disclose solutions of brake caliper bodies with reinforcing elements, e.g. arranged around the caliper bodies. In some of these well-known solutions, the caliper body is symmetrical according to planes passing through the disc axis or through the disc middle line. In other solutions, the caliper body has large, distributed windows, which may also be through windows, which form elongated reinforcement elements arranged longitudinally to the caliper body. Document DE102008029582 discloses a caliper body.

Although satisfactory from many points of view, these known solutions still do not make it possible to obtain structures which maximize the structural rigidity of the caliper body, reducing weight and at the same time which can contain dimensions as much as possible so as to facilitate the assembly of the body of the caliper also inside rims and wheels on which brake discs of large diameter are mounted.

The brake calipers are also known in which part of the caliper body geometry is symmetrical with respect to some planes of symmetry. An example is given by EP2553289 by Freni Brembo SPA.

This caliper body is optimal in its geometry to maximize structural rigidity and at the same time achieve the extremely conflicting objectives of allowing the cooling of the caliper body and its ventilation when subject to high braking actions and therefore to strong temperature changes.

However, this well-known solution is very complex to build and requires design changes to be applied to a different vehicle or even to a different axle thereof, and also to be used in the left or right wheel of the vehicle while maintaining its trailing or leading arrangement in both the left and right wheels.

The need to simplify the geometry of the caliper to make it suitable for multiple applications remains strongly felt.

Caliper bodies are also known which are more adaptable to different applications.

For example, document US2003178261 by Freni Brembo SPA shows such a solution.

However, this well-known solution is heavier than the previous one to be used, and as an unsprung mass, it penalizes vehicle performance.

Making it lighter would make it unsuitable for more demanding applications, such as sports cars.

The problem of modifying the structure and geometry of the caliper body to make it suitable for sports or racing vehicles and at the same time suitable for multiple uses, is therefore still felt.

Other similar solutions are known from U.S. Pat. No. 9,371,874 by Freni Brembo SPA, US2013199879 by MERITOR HEAVY VEHICLE BRAKING and U.S. Pat. No. 7,234,568 by Freni Brembo SPA.

It is also known to make caliper bodies further lightened and provided with reinforcing bars inclined with respect to the axial direction of the disc or to the circumferential direction of the disc itself.

For example, document EP1911989 by Freni Brembo SPA shows a solution in which the connecting elements of the elongated elements are inclined.

These well-known solutions, although excellent for the structural rigidity of the caliper body, have proven to be even more complex to make and to adapt to right or left wheels of the vehicle, or to front and rear axles should one desire to define a preferred trailing or leading arrangement of the caliper on the brake disc with respect to the direction of travel of the vehicle.

Other similar solutions are known from WO2017081488 by LIBERTY VEHICLE TECH LTD, US2016208872 by AKEBONO BRAKE IND, EP2738414 by AKEBONO BRAKE IND and EP2516879 by Freni Brembo SPA.

Solution

Therefore, it is an object of the present invention to provide a brake disc caliper body and a disc brake caliper having structural and functional characteristics such as to satisfy the aforementioned requirements and to overcome the drawbacks previously mentioned with reference to the discs of the prior art.

These and other objects are achieved by a caliper body of disc brake disc and a caliper of disc brake disc as described and claimed herein.

Some advantageous embodiments are the subject of the dependent claims.

By virtue of the caliper body suggested by the present invention it is possible to achieve high performance while reducing the overall dimensions of the caliper body and at the same time maintain maximum flexibility with the same geometry.

Advantageously, the suggested solution allows high braking performance also for non-extreme sports cars, and also racing cars.

By virtue of the suggested simplified geometry and simple construction, it is possible to increase the volumes of calipers which can be produced, whereby reducing the production costs themselves and thus making this high performance accessible to vehicles which are less expensive as a whole and therefore intended for lower market segments, despite still being sporty or suitable for racing.

For example, by virtue of the suggested solution, the same brake caliper is adapted to be installed on:
- a front right wheel in trailing position with respect to the direction of travel, but also
- a front right wheel in leading position with respect to the direction of travel, but also
- a front left wheel in trailing position with respect to the direction of travel, but also
- a front left wheel in leading position with respect to the direction of travel, but also
- a rear right wheel in trailing position with respect to the direction of travel, but also
- a rear right wheel in leading position with respect to the direction of travel, but also
- a rear left wheel in trailing position with respect to the direction of travel, but also
- a rear left wheel in leading position with respect to the direction of travel.

Therefore, this solution makes it possible to reach high production volumes and consequently a low number of part numbers for users, who therefore need to apply for a lower number of certifications or approvals for use.

Furthermore, the operating costs are reduced because fewer parts must be kept on stock to guarantee the requisite spare parts, whereby allowing the same caliper to be used for eight different applications, albeit on the same vehicle, as well as on multiple platforms.

FIGURES

Further features and advantages of the invention will be apparent from the description provided below of preferred embodiments thereof, given by way of non-limiting examples, with reference to the accompanying drawings, in which.

DESCRIPTION OF SOME PREFERRED EMBODIMENTS

Figure 1:
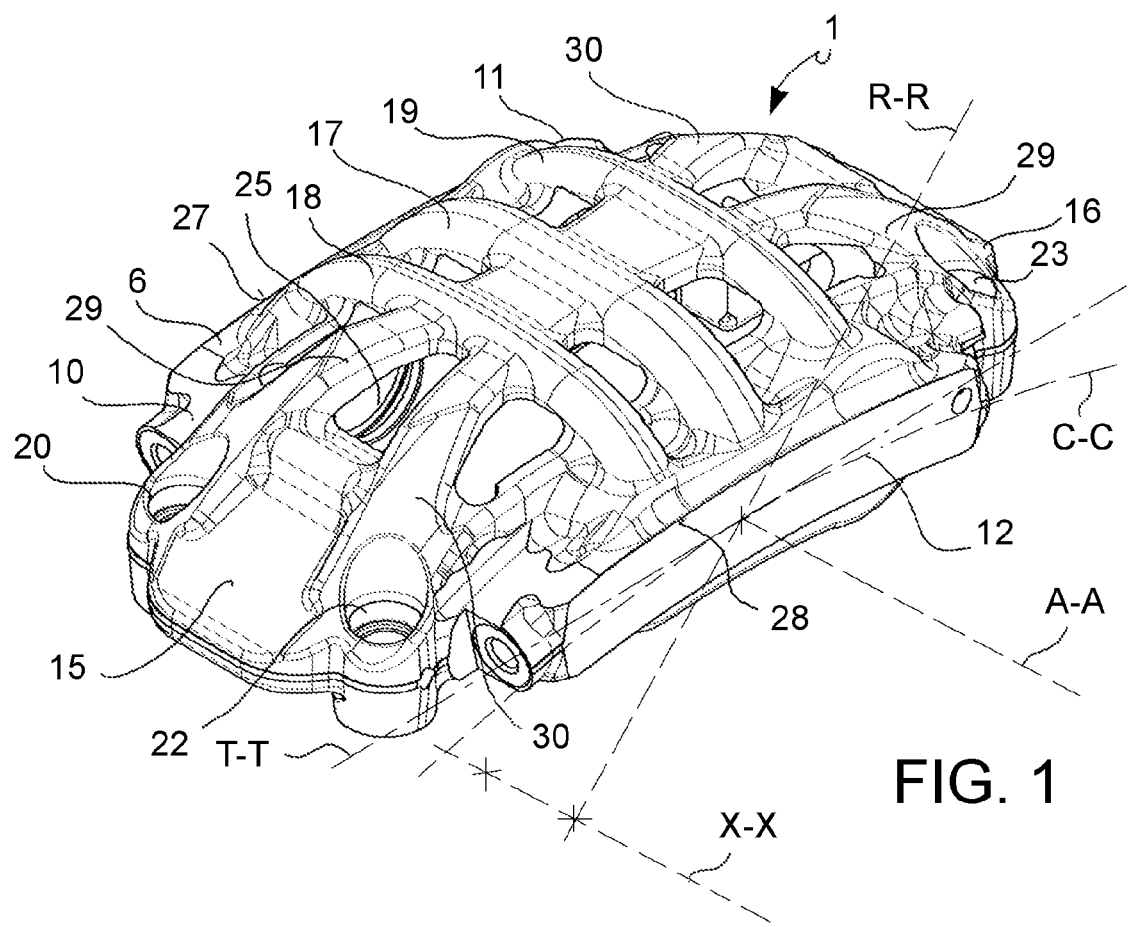
FIG. 1 is an axonometric view of a caliper body according to the invention.
Figure 2:
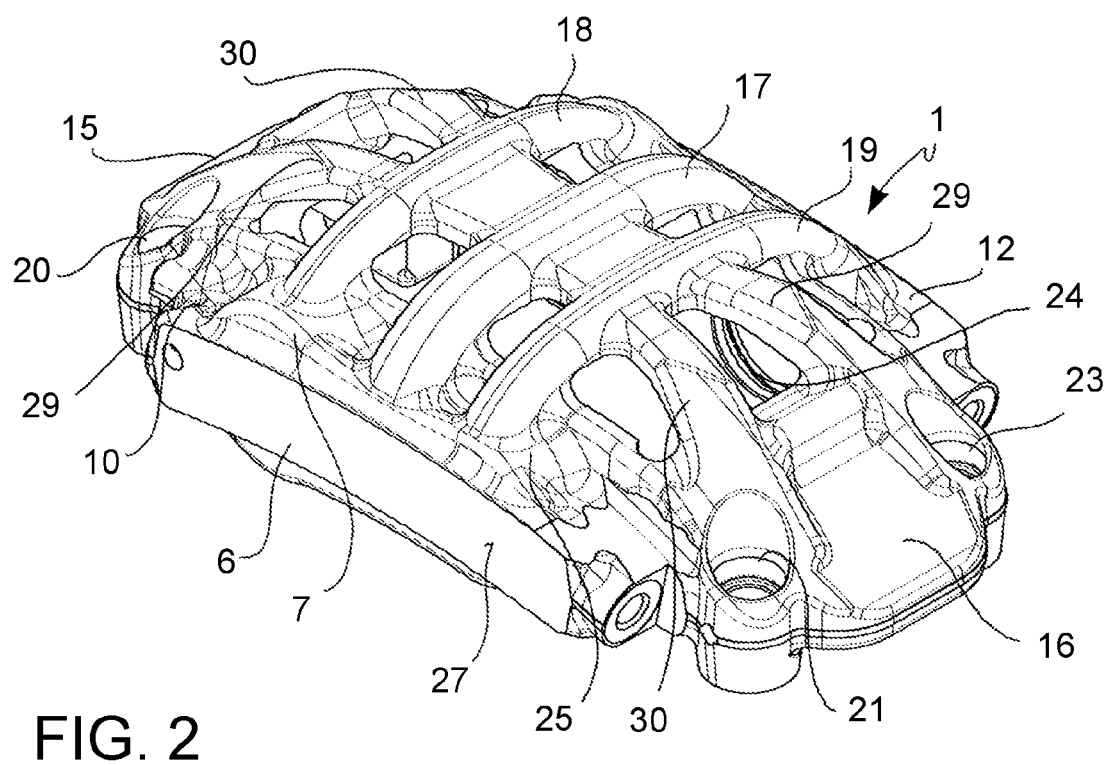
FIG. 2 shows a view of the caliper body of FIG. 1 from an opposite point of view.
Figure 3:
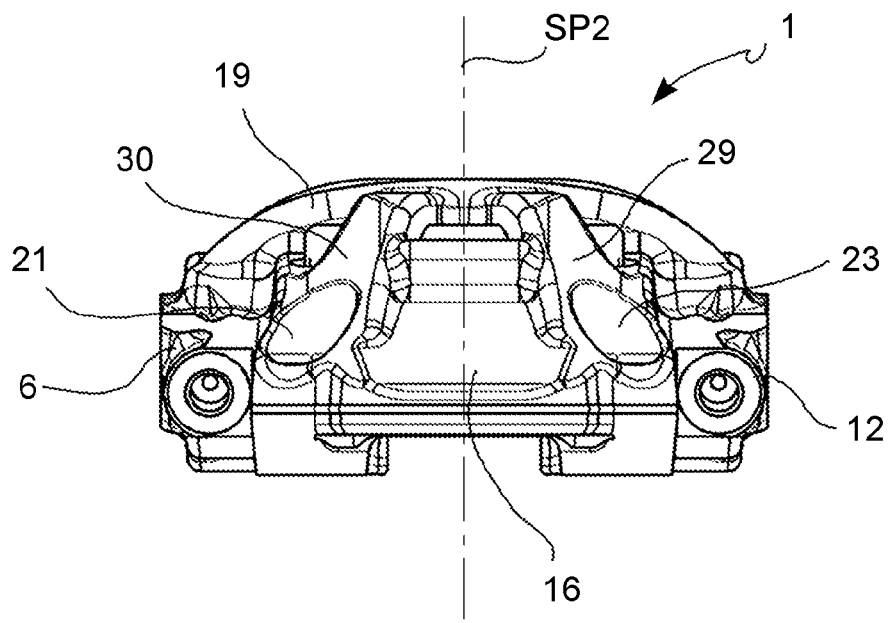
FIG. 3 is a side view of the caliper body in FIG. 1.
Figure 4:
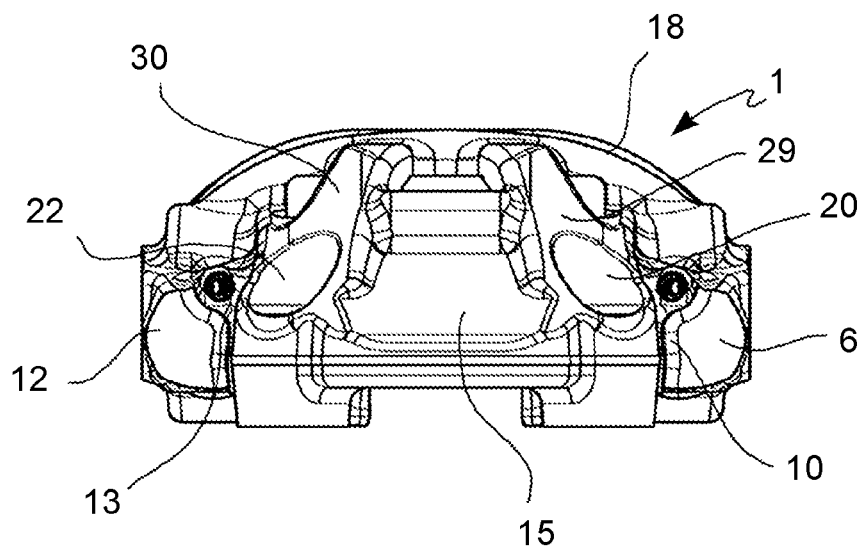
FIG. 4 is a side view of the opposite part with respect to FIG. 3 of the caliper body in FIG. 1.
Figure 5:
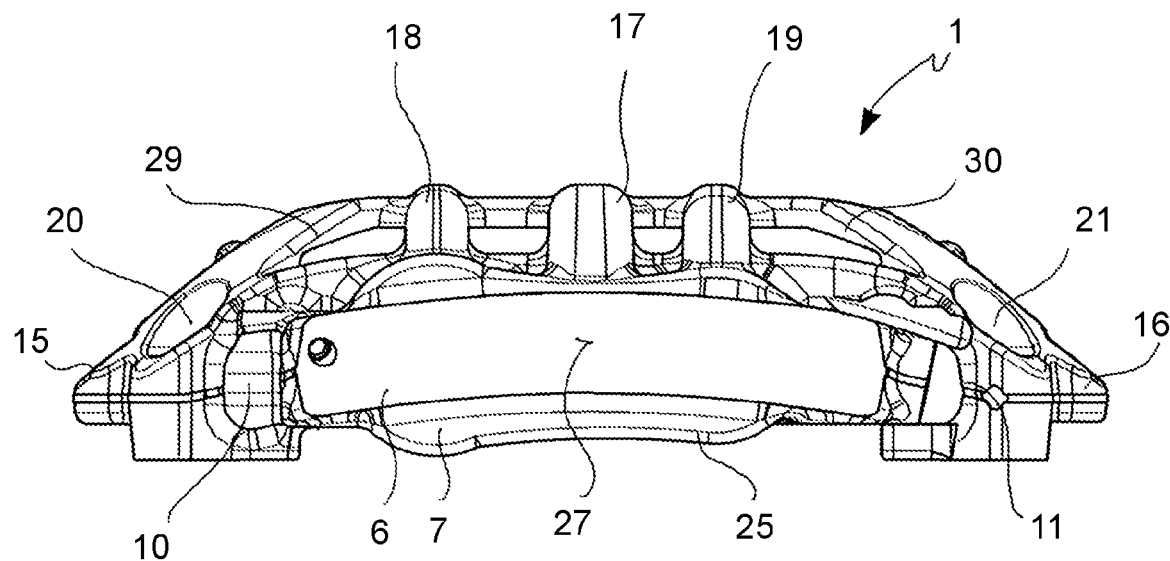
FIG. 5 is a front view of the caliper body in FIG. 1.
Figure 6:
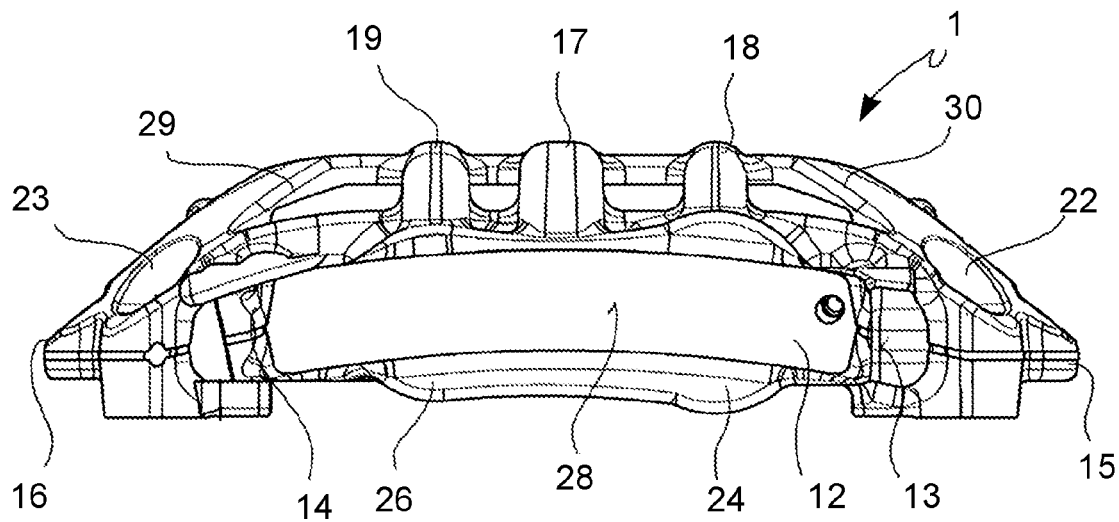
FIG. 6 is a front view of the opposite part with respect to FIG. 5 of the caliper body in FIG. 1.
Figure 7:
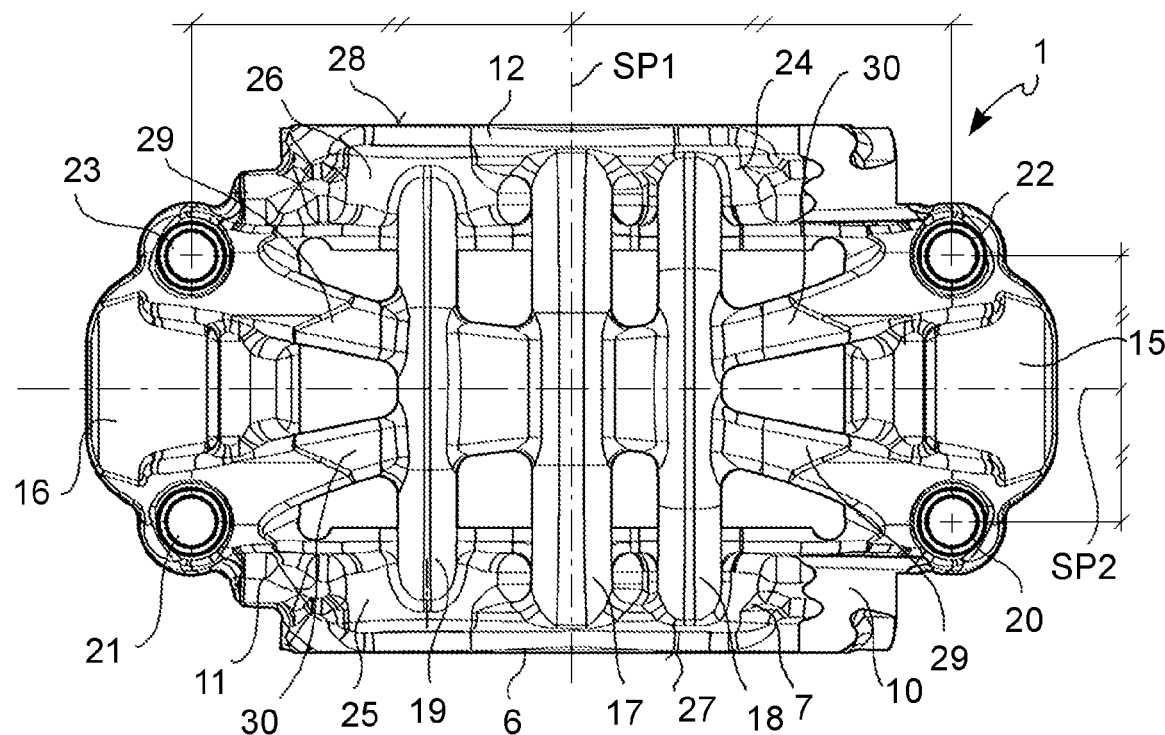
FIG. 7 shows a view from above or in radial direction looking towards the rotation axis of the disc that can be associated with the caliper in FIG. 1.
Figure 8:
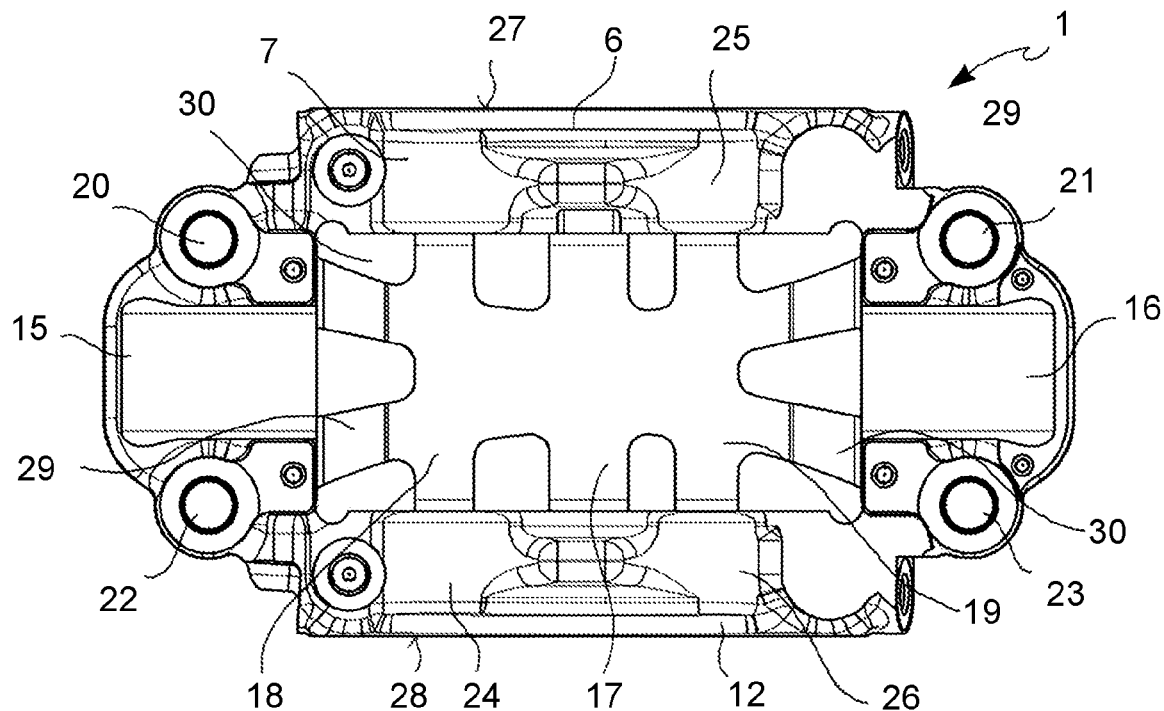
FIG. 8 shows a view from below or in radial direction opposite with respect to FIG. 7, of the caliper of FIG. 1.
Figure 9:
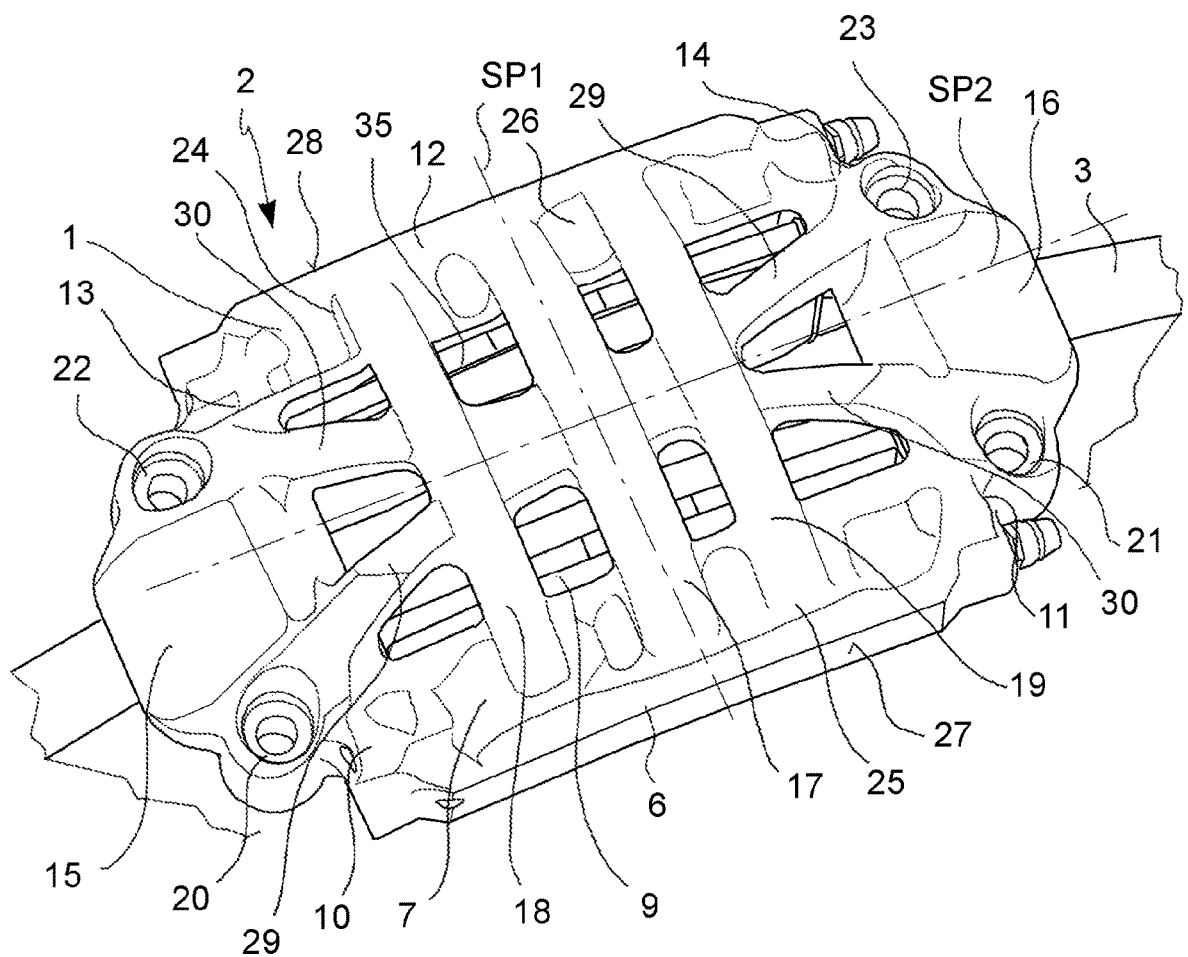
FIG. 9 is an axonometric view of a caliper according to the invention.
Figure 10:
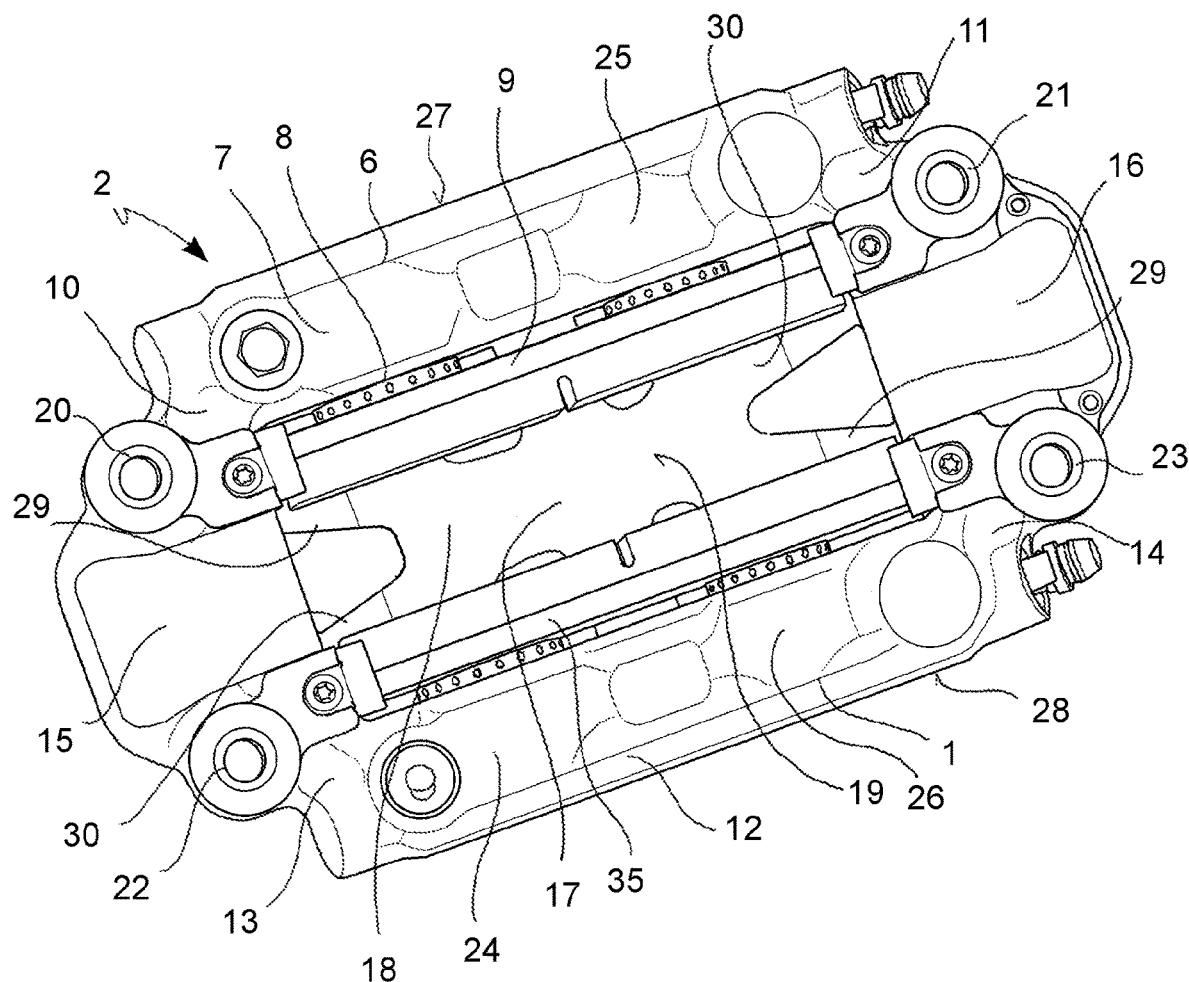
FIG. 10 shows an axonometric view from coupling side to a brake disc of the caliper in FIG. 9.
Figure 11:
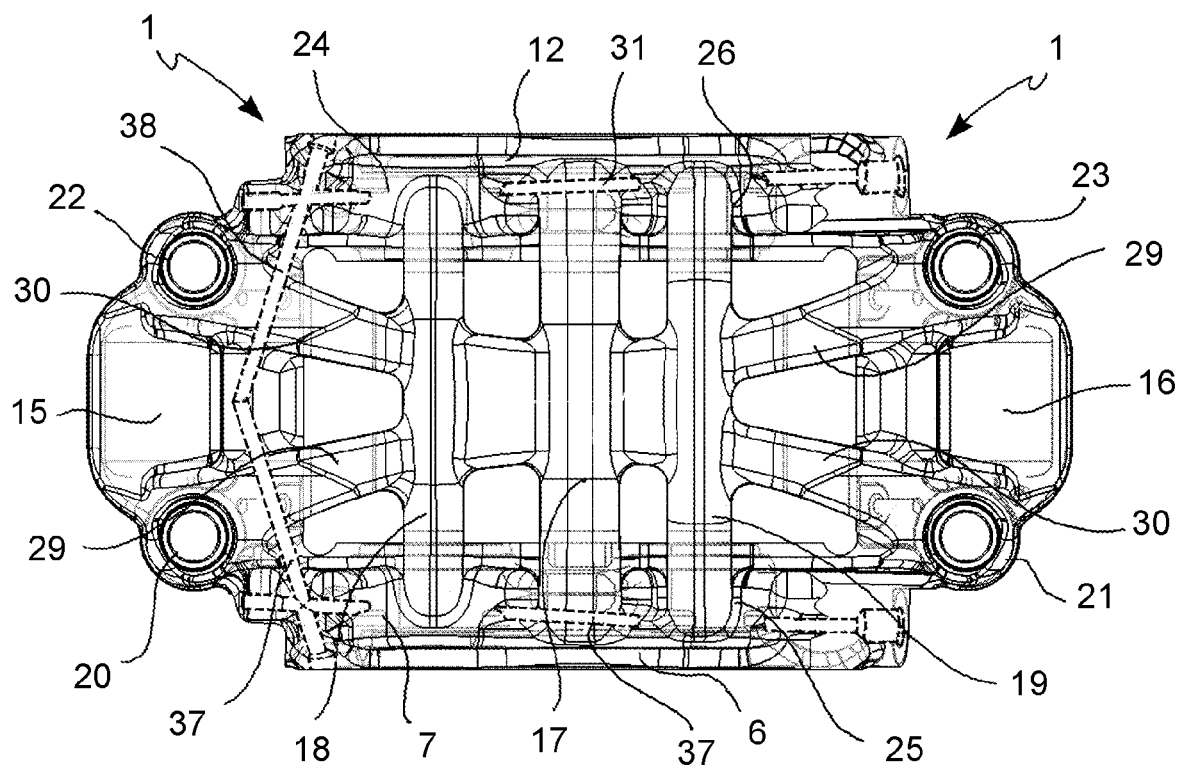
FIG. 11 is a view in radial direction of a caliper body, in which the brake fluid feeding pipes to the cylinder chambers or thrust device housings can be seen in transparency.
Figure 12:
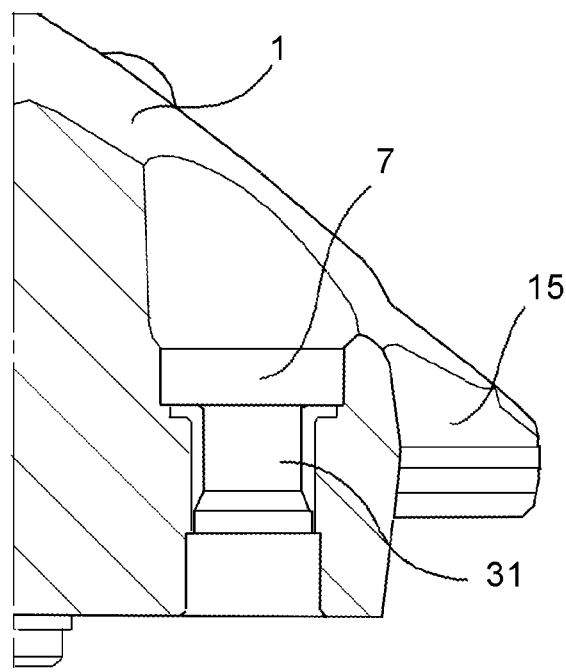
FIG. 12 shows a local section of a connecting housing of the caliper body to a vehicle support.
Figure 13:
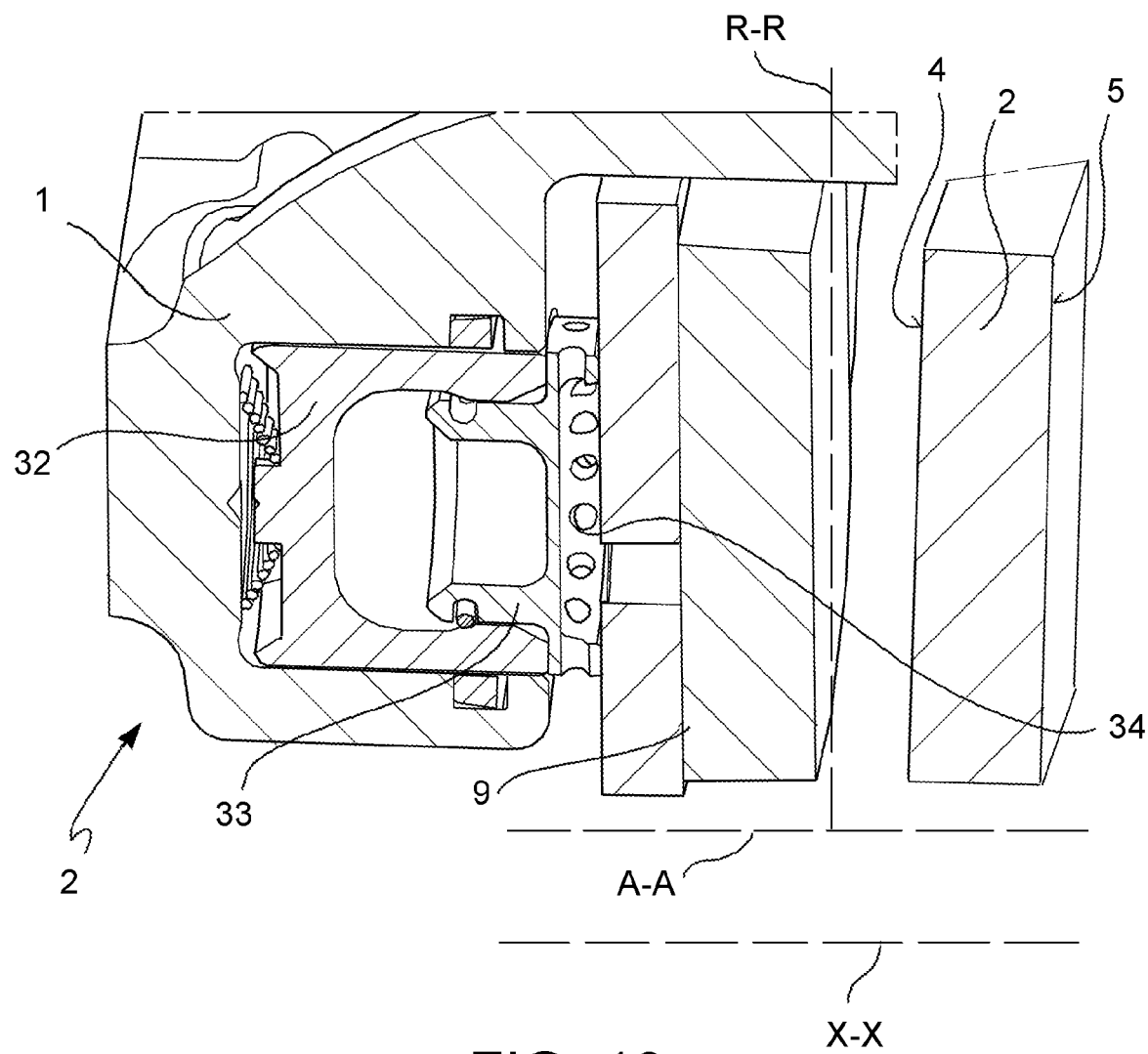
FIG. 13 shows an axonometric section view of a detail of a housing containing a thrust device facing a brake pad, which in turn faces a disc brake disc.

According to a general embodiment, a caliper body 1 of disc brake caliper 2 is provided. Said caliper body 1 is adapted to be arranged straddling a brake disc 3 having a first and a second braking surface 4, 5 opposite each other. Said disc 3 is adapted to rotate about a rotation axis X-X which defines an axial direction A-A, as well as radial directions R-R orthogonal to said axial direction A-A and passing through said rotation axis X-X, as well as a circumferential direction C-C orthogonal to each of said radial directions R-R and to axial direction A-A, as well as in a specific point a tangential direction T-T orthogonal to the axial A-A and radial R-R directions passing through said point.

Said caliper body 1 comprises a first elongated element 6 adapted to face the first braking surface 4 of said brake disc 3. Said first elongated element 6 accommodates at least one first housing 7 adapted to receive at least one first thrust device 8 adapted to bias a first brake pad 9 to abut against said first braking surface 4.

Said first elongated element 6 mainly extends along the circumferential direction C-C and comprises a first and second opposite ends 10, 11 of first elongated element.

Said caliper body 1 comprises a second elongated element 12 adapted to face the second braking surface 5 of said brake disc 3.

Said first elongated element 6 mainly extends along the circumferential direction C-C and comprises first and second opposite ends 13, 14 of second elongated element.

Said first ends 10, 13 of first and second elongated elements face each other.

Said second ends 11, 14 of first and second elongated elements face each other.

Said first ends 10, 13 of first and second elongated elements are connected to each other by a first end bridge 15.

Said second ends 11, 14 of first and second elongated elements are connected to each other by means of a second end bridge 16.

Said first and second elongated elements 6, 12 are further connected to each other by at least one central bridge 17; 18; 19 arranged between said end bridges 15, 16 following said caliper body in circumferential direction C-C.

Either said first or said second elongated element 6, 12 comprises two connecting housings 20, 21; 22, 23 for connecting said caliper body to a support for the caliper body provided on a vehicle.

Advantageously, said first elongated element 6 comprises two connecting housings 20, 21 of first elongated element adapted to connect said caliper body to a support for the caliper body provided in a vehicle.

Advantageously, said second elongated element 12 comprises two connecting housings 22, 23 of second elongated element adapted to connect said caliper body to a support for the caliper body provided in a vehicle.

According to an embodiment, said four connecting housings 20, 21, 22, 23 of first and second elongated elements are arranged symmetrically with respect to a first symmetry plane SP1 comprising an axial direction and a radial direction.

According to an embodiment, said first symmetry plane SP1 passes through half the distance between said first and second connecting housings 20, 21 of first elongated element.

According to an embodiment, said first symmetry plane SP1 passes through half the distance between said first and second connecting housings 22, 23 of second elongated element.

According to an embodiment, said four connecting housings 20, 21, 22, 23 of first and second elongated elements are arranged symmetrically with respect to a second symmetry plane SP2 comprising a circumferential direction and a radial direction.

According to an embodiment, said second symmetry plane SP2 passes through half the distance between said first connecting housings 20, 22 of first and second elongated elements.

According to an embodiment, said second symmetry plane SP2 passes through half the distance between said first and second connecting housings 21, 23 of second elongated element.

According to an embodiment, said second symmetry plane SP2 passes through the middle line of the associable brake disc 3.

According to an embodiment, said first and second elongated elements 6, 12 are connected to each other by three central bridges 17, 18, 19.

According to an embodiment, said three central bridges 17, 18, 19 are arranged symmetrically with respect to a first symmetry plane SP1 comprising an axial direction and a radial direction.

According to an embodiment, said three central bridges 17, 18, 19 are arranged symmetrically with respect to a second symmetry plane SP2 comprising a circumferential direction and a radial direction.

According to an embodiment, two of said three central bridges 18, 19 are connected to said first and second elongated elements 6, 12 near the bottom walls or bottoms of the thrust device housings 7, 24, 25, 26 of first and second elongated elements.

According to an embodiment, the third of these three central bridges 17 connects to said first and second elongated element 6, 12 near the outer elongated element edge 27, 28.

According to an embodiment, said two end bridges 15, 16 are arranged symmetrically with respect to a first symmetry plane SP1 comprising an axial direction and a radial direction.

According to an embodiment, said two end bridges 15, 16 are arranged symmetrically with respect to a second symmetry plane SP2 comprising a circumferential direction and a radial direction.

According to an embodiment, said three central bridges 17, 18, 19 extend as an arch on the axial radial plane so as to be arranged straddling the associable disc 3 of brake disc and reduce the radial dimensions or thickness of the elongated elements 6, 12.

According to an embodiment, a reinforcement bridge 29, 30 protrudes from each of said connecting housings 20, 21, 21, 22 of first and second elongated elements.

According to an embodiment, a first reinforcement bridge protrudes from said first connecting housing 20 of first elongated element and reaches said second connecting housing 23 of second elongated element.

According to an embodiment, said first reinforcement bridge 29 connects to said central bridges 17, 18, 19.

According to an embodiment, said first and second reinforcement bridges 29, 30 are arranged symmetrically with respect to a first symmetry plane SP1 comprising an axial direction and a radial direction.

According to an embodiment, said first and second reinforcement bridges 29, 30 are arranged symmetrically with respect to a second symmetry plane SP2 comprising a circumferential direction and a radial direction.

According to an embodiment, each of said first and second elongated elements 6, 12 comprises a thrust device housing 7, 24.

According to an embodiment, each of said first and second elongated elements 6, 12 comprises two thrust device housings 7, 24, 25, 26.

According to an embodiment, each of said thrust element housings 7, 24, 25, 26 faces a thrust device housing 24, 7, 26, 25 of the facing elongated element 12, 6.

According to an embodiment, each of said connecting housings 20, 21, 22, 23 accommodates a housing insert 31 made of a material with contrasts the connection of the caliper body 1 to a support for a vehicle.

According to an embodiment, each of said thrust device housings 7, 20, 21, 22, 23 comprises a cylinder adapted to accommodate a piston comprising a piston body 32 to which a thrust element 33 is connected having a radiator portion 34 to dissipate the heat produced by the braking action and to allow the passage of cooling air.

According to an embodiment, said piston body 32 is made of a first material, e.g. aluminum, and said thrust element 33 is made of a second material, e.g. steel.

According to an alternative embodiment, said caliper body 1 is made of forged metal.

According to an embodiment, said caliper body is made of aluminum or aluminum alloy.

According to an embodiment, said caliper body is of steel.

According to an alternative embodiment, said caliper body is made of titanium.

According to an embodiment, said caliper body is made from solid material, e.g. by mechanical machining.

The present invention further relates to a brake caliper 2 comprising a caliper body as described in any one of the embodiments described above.

The present invention also relates to a disc brake comprising said caliper.

Those skilled in the art may make many changes and adaptations to the embodiments described above or may replace elements with others which are functionally equivalent in order to meet contingent needs without however departing from the scope of the appended claims.

LIST OF REFERENCES

1 caliper body
2 disc brake caliper
3 brake disc
4 opposite first braking surface
5 opposite second braking surface
6 first elongated element
first elongated first element thrust device housing
8 first thrust device
9 first brake pad
10 first elongated element first opposite end
11 first elongated element second opposite end
12 second elongated element
13 second elongated element first opposite end
14 second elongated element second opposite end
15 first end bridge
16 second end bridge
17 first central bridge
18 second central bridge
19 third central bridge
20 first elongated element first connecting housing
21 first elongated element second connecting housing
22 second elongated element first connecting housing
23 second elongated element second connecting housing
24 second elongated element first thrust device housing
25 first elongated element second thrust device housing
26 second elongated element second thrust device housing
27 elongated element outer edge
28 elongated element outer edge
29 first reinforcement bridge
30 second reinforcement bridge
31 housing insert
32 piston body
33 thrust element
34 radiator portion
35 second brake pad
36 brake fluid feeding pipe
37 brake fluid feeding pipe
38 brake fluid feeding pipe
39 brake fluid feeding pipe
X-X rotation axis
A-A axial direction parallel to X-X
R-R radial direction orthogonal to A-A
T-T tangential direction punctually orthogonal to A-A and R-R
C-C circumferential direction orthogonal to axial direction A-A and radial direction R-R
SP1 first radial axial symmetry plane
SP2 second radial circumferential symmetry plane

The invention claimed is:

1. A caliper body of a disc brake caliper, wherein said caliper body is adapted to be arranged straddling a brake disc having first and second opposite braking surfaces adapted to rotate about a rotation axis (X-X) defining an axial direction (A-A), radial directions (R-R) orthogonal to said axial direction (A-A) and passing through said rotation axis (X-X), a circumferential direction (C-C) orthogonal to each of said radial directions (R-R), and in a specific point a tangential direction (T-T) orthogonal to the axial (A-A) and radial (R-R) directions passing through said specific point, wherein said caliper body comprises a first elongated element adapted to face the first braking surface of said brake disc, said first elongated element accommodates at least one first thrust device housing adapted to receive at least one first thrust device adapted to bias brake pads to abut against the first and second opposite braking surfaces;

said first elongated element mainly extends along the circumferential direction (C-C) and comprises first and second opposite ends of said first elongated element;

said caliper body comprises a second elongated element adapted to face the second braking surface of said brake disc;

said second elongated element mainly extends along the circumferential direction (C-C) and comprises first and second opposite ends of said second elongated element;

said first ends of first and second elongated elements face each other;

said second ends of first and second elongated elements face each other;

said first ends of first and second elongated elements are connected to each other by a first end bridge;

said second ends of first and second elongated elements are connected to each other by a second end bridge;

said first and second elongated elements are further connected to each other by at least one central bridge arranged between said first and second end bridges following said caliper body in circumferential direction (C-C);

wherein said first elongated element comprises two connecting housings;

said second elongated element comprises two connecting housings.

2. The caliper body of claim 1, wherein said first and second elongated elements are connected to each other by three central bridges.

3. The caliper body of claim 2, wherein said three central bridges are arranged symmetrically with respect to the first symmetry plane (SP1) comprising an axial direction and a radial direction.

4. The caliper body of claim 2, wherein said three central bridges are arranged symmetrically with respect to the second symmetry plane (SP2) comprising a circumferential direction and a radial direction.

5. The caliper body of claim 2, wherein two of said three central bridges are connected to said first and second elongated elements near bottom walls or bottoms of thrust device housings of first and second elongated elements.

6. The caliper body of claim 2, wherein the third of the three central bridges connects to said first and second elongated element near an outer elongated element edge.

7. The caliper body of claim 1, wherein:

said connecting housings of said first and second elongated elements are arranged symmetrically with respect to a first symmetry plane (SP1) comprising an axial direction and a radial direction;

and wherein said first symmetry plane (SP1) passes through half a distance between said first and second connecting housings of said first elongated element;

and wherein said first symmetry plane (SP1) passes through half the distance between said first and second connecting housings of said second elongated element.

8. The caliper body of claim 1, wherein:

said connecting housings of said first and second elongated elements are arranged symmetrically with respect to a second symmetry plane (SP2) comprising a circumferential direction and a radial direction;

and wherein said second symmetry plane (SP2) passes through half the distance between said first connecting housings of said first and second elongated elements;

and wherein said second symmetry plane (SP2) passes through half the distance between said second connecting housings of said first and second elongated elements.

9. The caliper body of claim 1, wherein said second symmetry plane (SP2) passes through a middle line of an associable brake disc.

10. The caliper body of claim 1, wherein said first and second end bridges are arranged symmetrically with respect to the first symmetry plane (SP1) comprising an axial direction and a radial direction.

11. The caliper body of claim 1, wherein:

said first and second end bridges are arranged symmetrically with respect to the second symmetry plane (SP2) comprising a circumferential direction and a radial direction;

and wherein said three central bridges extend as an arch on an axial radial plane so as to be arranged straddling the associable brake disc and reduce radial dimensions or thickness of the elongated elements;

and wherein a reinforcement bridge protrudes from each of said connecting housings of said first and second elongated elements.

12. The caliper body of claim 1, wherein:

a first reinforcement bridge protrudes from said first connecting housing of first elongated element and reaches said second connecting housing of second elongated element;

and wherein said first reinforcement bridge connects to said central bridges.

13. The caliper body of claim 1, wherein said first and second reinforcement bridges are jointly arranged symmetrically with respect to the first symmetry plane (SP1) comprising an axial direction and a radial direction.

14. The caliper body of claim 1, wherein:

said first and second reinforcement bridges are jointly arranged symmetrically with respect to the second symmetry plane (SP2) comprising a circumferential direction and a radial direction, and wherein each of said first and second elongated elements comprises a thrust device housing;

and wherein each of said first and second elongated elements comprises two thrust device housings;

and wherein each of said thrust device housings faces a thrust device housing of a facing elongated element;

and wherein each of said connecting housings accommodates a housing insert made of a material contrasting connection of the caliper body to a support provided in the vehicle;

and wherein each of said thrust device housings comprises a cylinder adapted to accommodate a piston comprising a piston body to which a thrust element is connected having a radiator portion to dissipate heat produced by a braking action and to allow passage of cooling air;

and wherein said piston body is made of a first material, that is aluminum, and said thrust element is made of a second material, that is steel;

wherein said caliper body is made of forged metal.

15. A brake caliper comprising a caliper body according to claim 1.

* * * * *